United States Patent
Lee et al.

(10) Patent No.: US 9,584,718 B2
(45) Date of Patent: Feb. 28, 2017

(54) DISPLAY DEVICE AND METHOD OF CONTROLLING THEREFOR

(71) Applicant: LG ELECTRONICS INC., Seoul (KR)

(72) Inventors: Doyoung Lee, Seoul (KR); Sinae Chun, Seoul (KR)

(73) Assignee: LG ELECTRONICS INC., Seoul (KR)

(*) Notice: Subject to any disclaimer, the term of this patent is extended or adjusted under 35 U.S.C. 154(b) by 99 days.

(21) Appl. No.: 14/547,909

(22) Filed: Nov. 19, 2014

(65) Prior Publication Data

US 2016/0065839 A1 Mar. 3, 2016

(30) Foreign Application Priority Data

Sep. 2, 2014 (KR) .................. 10-2014-0116205

(51) Int. Cl.
*H04N 5/222* (2006.01)
*H04N 5/232* (2006.01)
*H04N 5/272* (2006.01)

(52) U.S. Cl.
CPC ..... *H04N 5/23216* (2013.01); *H04N 5/23219* (2013.01); *H04N 5/23222* (2013.01); *H04N 5/23293* (2013.01); *H04N 5/272* (2013.01)

(58) Field of Classification Search
CPC ........... H04N 5/23216; H04N 5/23219; H04N 5/23222; H04N 5/23293; H04N 5/272
USPC ....................... 348/333.01–333.04
See application file for complete search history.

(56) References Cited

U.S. PATENT DOCUMENTS

| | | | |
|---|---|---|---|
| 9,171,198 B1* | 10/2015 | Raffle | G06K 9/00281 |
| 2008/0084482 A1 | 4/2008 | Hansson et al. | |
| 2008/0089587 A1* | 4/2008 | Kim | G06F 3/017 382/190 |
| 2010/0066810 A1 | 3/2010 | Ryu et al. | |
| 2012/0120186 A1 | 5/2012 | Diaz et al. | |
| 2012/0274808 A1 | 11/2012 | Chong et al. | |
| 2013/0131986 A1* | 5/2013 | Van Seggelen | G01C 21/3484 701/533 |
| 2013/0215286 A1* | 8/2013 | Ohya | H04N 5/37455 348/222.1 |
| 2013/0222232 A1* | 8/2013 | Kong | G06F 3/011 345/156 |
| 2013/0335587 A1* | 12/2013 | Takatsuka | H04N 5/23219 348/211.4 |
| 2014/0118257 A1* | 5/2014 | Baldwin | G06F 3/017 345/158 |

(Continued)

FOREIGN PATENT DOCUMENTS

WO WO 2013/183930 A1 12/2013

*Primary Examiner* — Yogesh Aggarwal
(74) *Attorney, Agent, or Firm* — Birch, Stewart, Kolasch & Birch, LLP

(57) ABSTRACT

A method of switching a display device according to one embodiment of the present specification can include the steps of displaying an image received from a rear side camera of the display device on a touch sensitive display unit positioned at the front side of the display device, setting an area on which a predetermined gesture is to be recognized based on a touch input and if a gesture substantially identical to the predetermined gesture is recognized on the set area in the image received from the rear side camera, capturing an image using the rear side camera.

19 Claims, 9 Drawing Sheets

(56) References Cited

U.S. PATENT DOCUMENTS

2014/0184854 A1 7/2014 Musatenko

* cited by examiner

FIG. 6
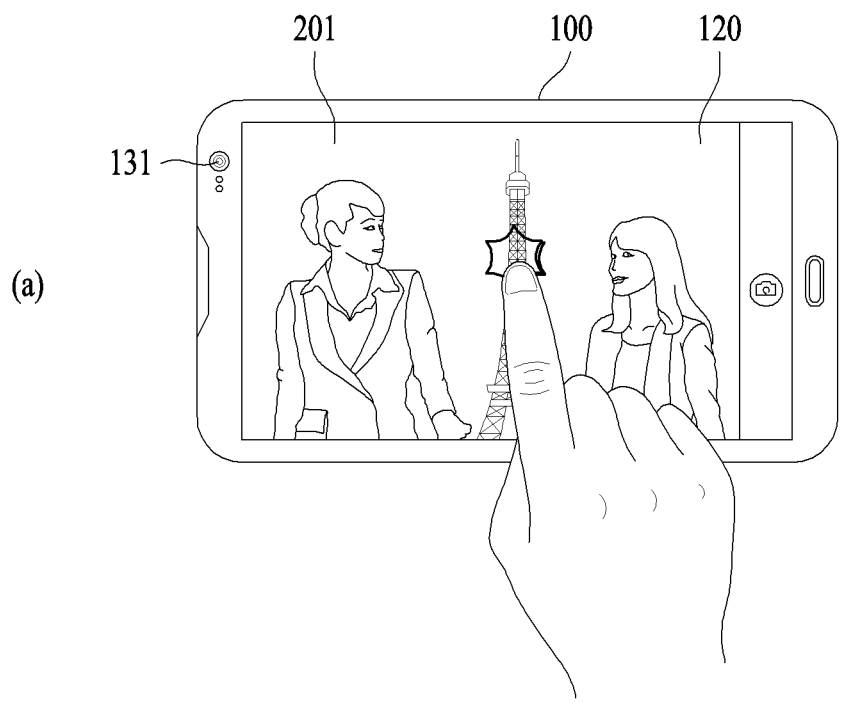
(a)
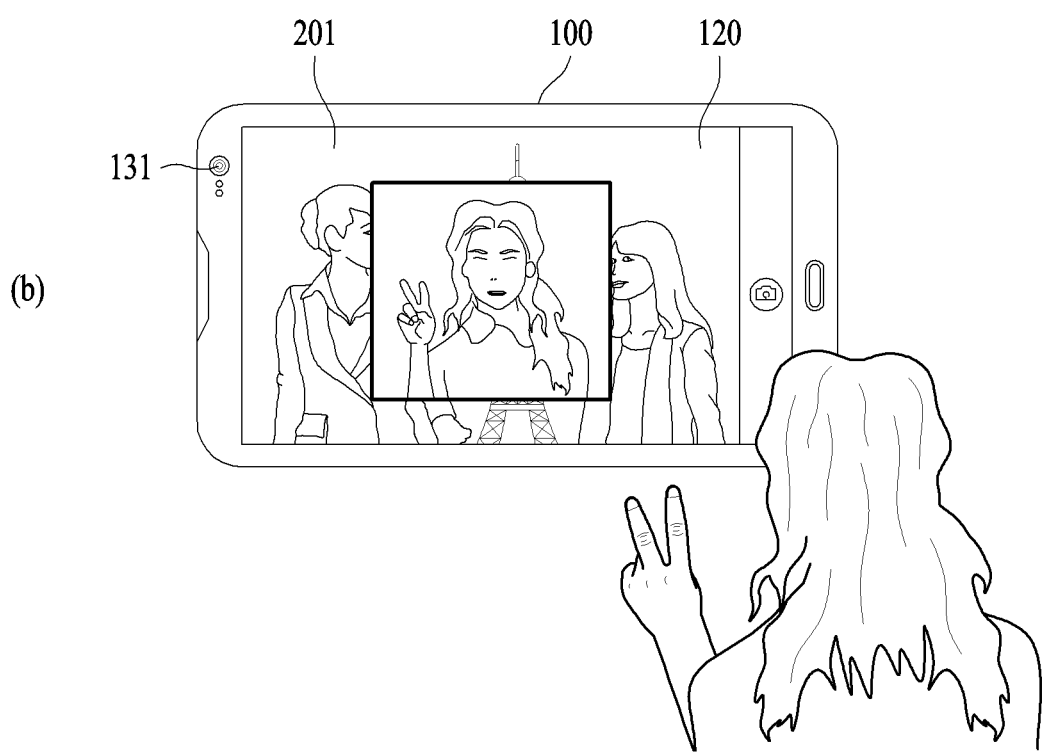
(b)

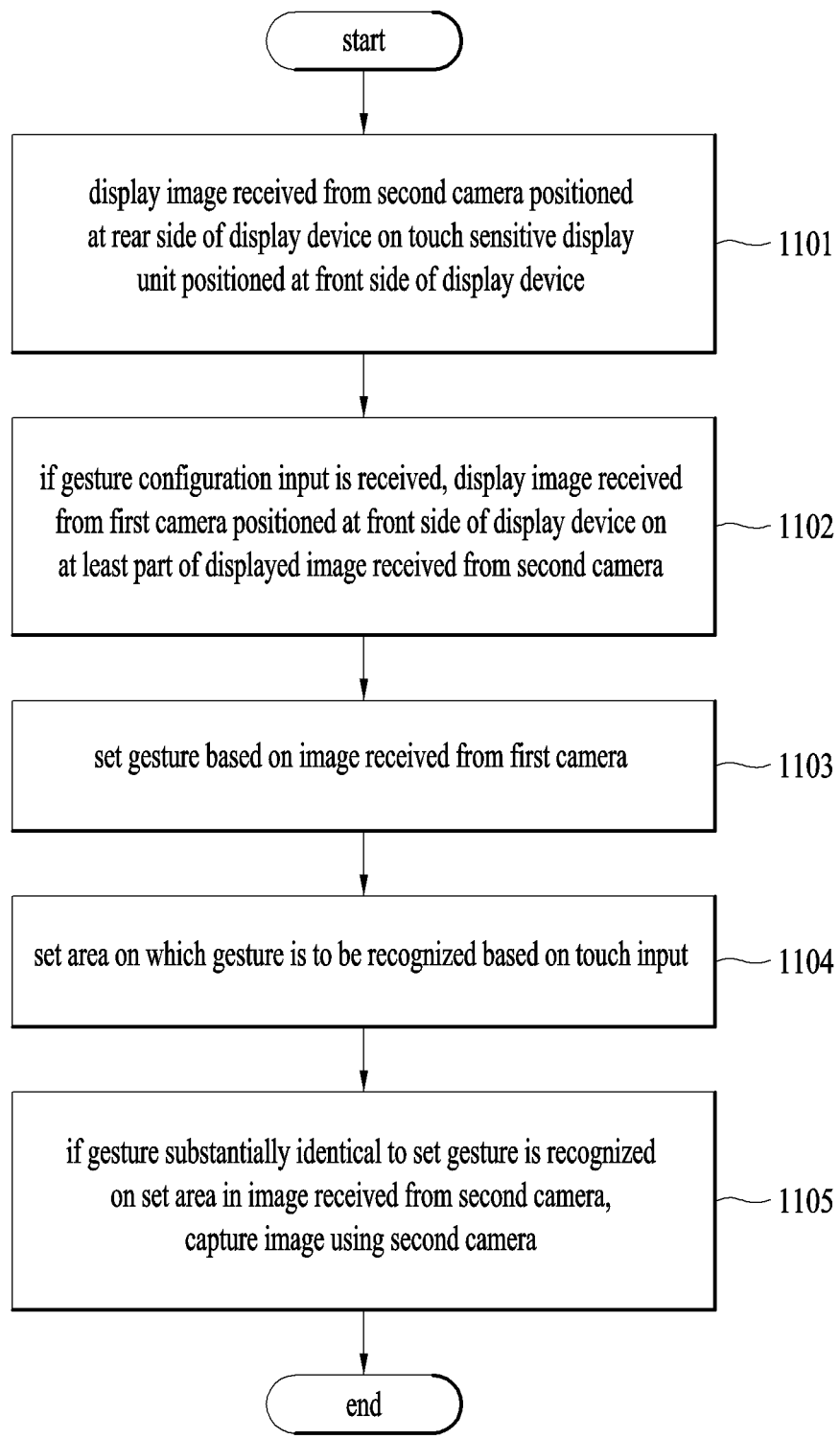

DISPLAY DEVICE AND METHOD OF CONTROLLING THEREFOR

This application claims the benefit of the Korean Patent Application No. 10-2014-0116205, filed on Sep. 2, 2014, which is hereby incorporated by reference as if fully set forth herein.

BACKGROUND OF THE INVENTION

Field of the Invention

The present specification relates to a display device and a method of controlling therefor.

Discussion of the Related Art

FIG. 1 is a diagram for one embodiment of a display device.

Referring to FIG. 1, a user captures an image using a rear side camera (not depicted) positioned at the rear side of a display device 100. The user may want to be captured with other persons in a picture. In this case, the user may ask someone else to take a picture. Yet, a picture taken by the other person may be different from a picture that the user wants to take. For instance, the picture taken by the other person may be different from a picture to which the user wants to take in terms of a posture and composition. In order to constantly maintain composition of a picture, a tripod can be used. Yet, since it is difficult to precisely know when a picture is taken in case of using a timer, it is hard to take a posture and a look that the user wants.

A user may select a method of taking a picture while directly watching an object by eyes of the user. In this case, the user holds the display device 100 by one hand and may take a picture using a front side camera 131. The user can check an image to be captured using a display unit 120. Yet, in case of using the front side camera 131, composition of a picture to be captured is limited due to a physical limitation of the user. Moreover, resolution of the front side camera 131 is lower than that of a rear side camera in general.

Hence, it is required to have a method of taking a picture in composition desired by a user using the rear side camera.

SUMMARY OF THE INVENTION

Accordingly, the present specification is directed to an apparatus and method thereof that substantially obviate one or more problems due to limitations and disadvantages of the related art.

An object of the present specification is to provide a display device capturing an image using a more intuitive user interface and a method of controlling therefor. In particular, the present specification intends to provide a method of more easily capturing an image using gesture recognition.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, according to one embodiment, a display device includes a rear side camera configured to sense an image positioned at the rear side of the display device, a touch sensitive display unit configured to be positioned at the front side of the display device and display at least one or more images and a processor configured to control the rear side camera and the touch sensitive display unit, the processor further configured to display an image received from the rear side camera on the touch sensitive display unit, the processor further configured to set an area on which a predetermined gesture is to be recognized based on a touch input, the processor, if a gesture substantially identical to the predetermined gesture is recognized on the area in the image received from the rear side camera, further configured to capture an image using the rear side camera.

To further achieve these objects and other advantages and in accordance with the purpose of the invention, as embodied and broadly described herein, according to a different embodiment, a display device includes a first camera configured to sense an image positioned at the front side of the display device, a second camera configured to sense an image positioned at the rear side of the display device, a touch sensitive display unit configured to be positioned at the front side of the display device and display at least one or more images and a processor configured to control the first camera, the second camera and the touch sensitive display unit, the processor further configured to display an image received from the second camera on the touch sensitive display unit, the processor, if a gesture configuration input is received, further configured to display an image received from the first camera on at least a part of the displayed image received from the second camera, the processor further configured to set a gesture based on the image received from the first camera, the processor further configured to set an area on which the set gesture is to be recognized based on a touch input, the processor, if a gesture substantially identical to the set gesture is recognized on the set area in the image received from the second camera, further configured to capture an image using the second camera.

A display device according to the present specification enables a user to more easily capture an image desired by the user.

A display device according to the present specification enables a user to more easily use the display device by providing an intuitive user interface.

It is to be understood that both the foregoing general description and the following detailed description of the present specification are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 6 is a diagram for registration of a gesture according to one embodiment;

FIG. 11 is a flowchart for a method of controlling a display device according to a different embodiment.

DETAILED DESCRIPTION OF THE INVENTION

Reference will now be made in detail to the preferred embodiments of the present specification, examples of which are illustrated in the accompanying drawings. While the embodiments have been concretely described with reference to the attached diagrams and the contents written on the diagrams, a scope of claims may be non-restricted or non-limited to the embodiments.

Although terminologies used in the present specification are selected from general terminologies used currently and widely in consideration of functions, they may be changed in accordance with intentions of technicians engaged in the corresponding fields, customs, advents of new technologies and the like. Occasionally, some terminologies may be arbitrarily selected by the applicant(s). In this case, the meanings of the arbitrarily selected terminologies shall be described in the corresponding part of the detailed description of the specification. Therefore, terminologies used in the present specification need to be construed based on the substantial meanings of the corresponding terminologies and the overall matters disclosed in the present specification rather than construed as simple names of the terminologies.

In the present specification, "capturing an image" indicates to capture an image received from a camera or a camera unit at the moment of capturing the image using the camera or the camera unit instead of capturing an image displayed on a display unit.

A display device according to the present specification can include a camera, a cellular phone, a wireless communication phone, a smartphone, a tablet PC, a PDA (personal digital assistant), a smartwatch, and other image capturing means.

Figure 1:
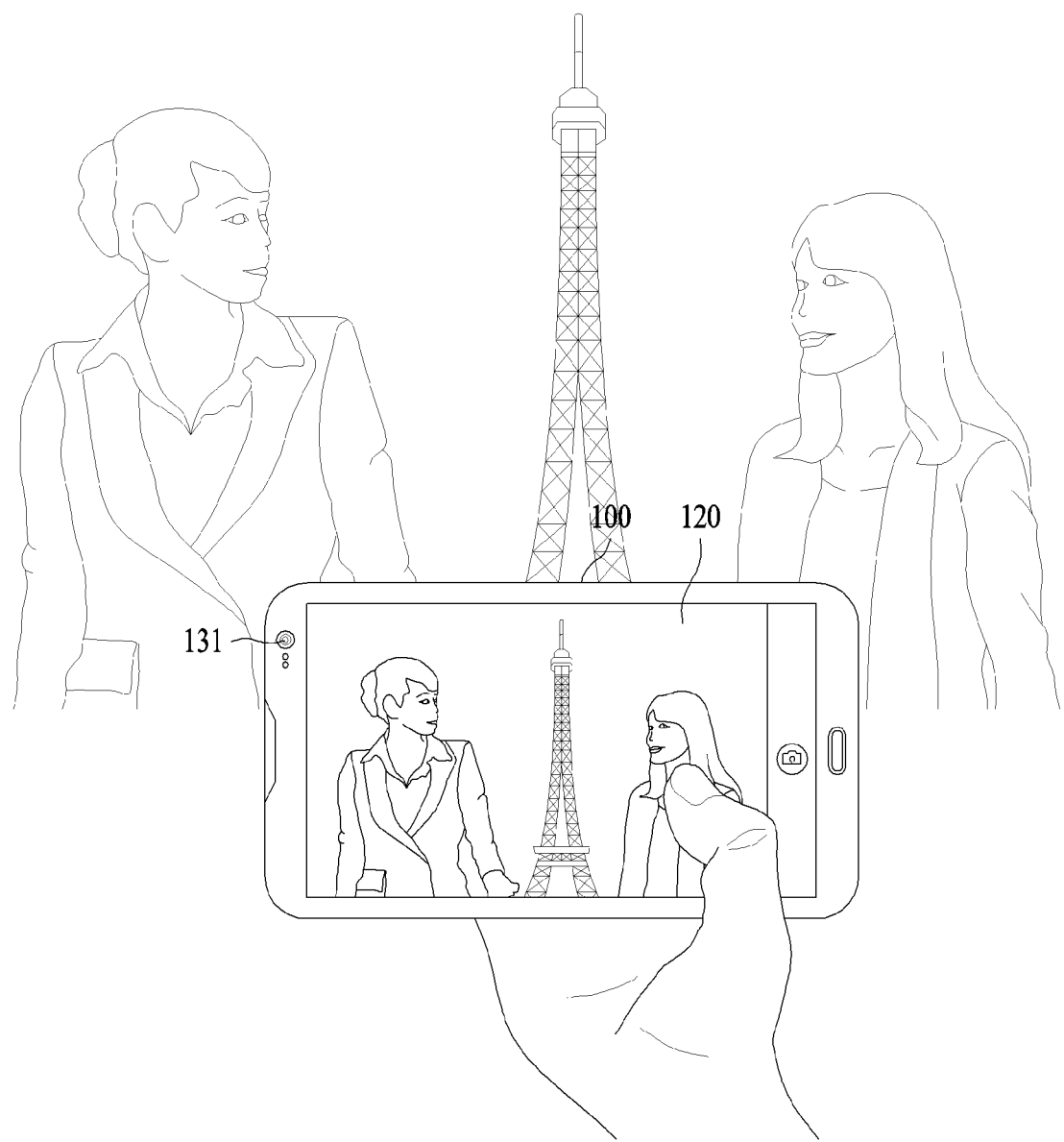
FIG. 1 is a diagram for one embodiment of a display device.
Figure 2:
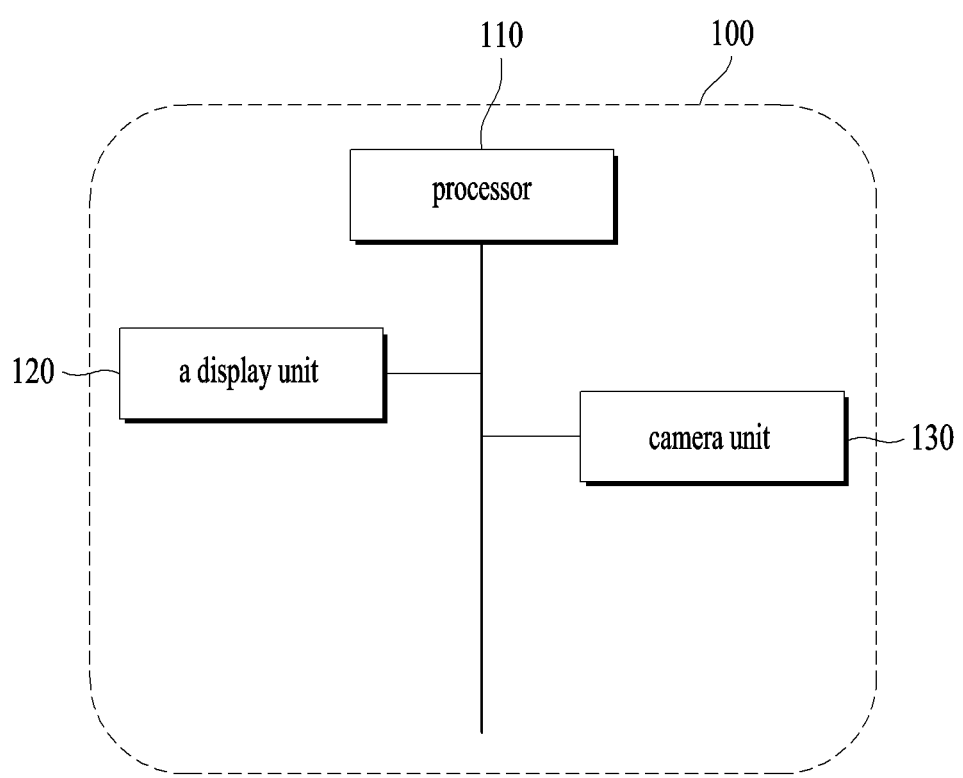
FIG. 2 is a block diagram for a display device according to one embodiment.

FIG. 2 is a block diagram for a display device according to one embodiment.

A display device 100 according to one embodiment can include a display unit 120, a camera unit 130 and a processor 110 controlling the display unit 120 and the camera unit 130.

The display unit 120 is positioned at the front side of the display device and can display at least one or more images. The at least one or more images can be received from the camera unit 130. The display unit 120 can include a LCD (liquid crystal display), a plasma display, or a display of a different type. The display unit 120 can display a foldable display, a rollable display, an extendible display, a stretchable display or a display of a different form factor.

The display unit 120 may include a touch sensor. In particular, the display unit 120 can include a touch sensitive display unit. The touch sensor may be positioned on the display unit 120 or may be positioned at the inside of the display unit 120. The touch sensor can sense such various contact or non-contact touch inputs as a sliding touch input, a multi touch input, a long-press touch input, a short-press touch input, a drag touch input, a hovering input, a flicking touch input and the like. Moreover, the touch sensor can sense a touch input inputted by such various input tools as a touch pen, a stylus pen and the like. The touch sensor can deliver a result of sensing a touch input to the processor 110.

The camera unit 130 includes a rear side camera sensing an image positioned at the rear side of the display device 100. The camera unit 130 may further include a front side camera sensing an image positioned at the front side of the display device 100. The camera unit 130 can include a lens unit, a lens driving unit and an image reception unit. The camera unit 130 can support AF (auto focusing) and may further include a fill light for the AF. The camera unit 130 may further include a flash. Configuration and details of the camera unit 130 can be selectively modified according to selection of a manufacturer and a specification of the display device 100.

Meanwhile, the display device 100 may further include other components not depicted in FIG. 2.

For instance, the display device may include a communication unit. The communication unit may use WLAN (wireless LAN), IEEE 802.11 based wireless LAN communication, Wibro (wireless broadband), Wimax (world interoperability for microwave access), HSDPA (high speed downlink packet access), Bluetooth, NFC (near field communication) and the like to access a wireless network. The communication unit can access the internet via a wired/wireless network.

The display device 100 may further include a camera, a memory, a power source, a housing, at least one or more sensors (e.g., an acceleration sensor, a gyro sensor, a terrestrial magnetism sensor, a GPS sensor, a pressure sensor, an altitude sensor or a proximity sensor), a voice reception sensor, a voice output unit or other components.

The processor 110 can control the display unit 120 and the camera unit 130. The processor 110 can control other components included in the display device 100. The processor 110 can execute various applications in a manner of processing data of the display device 100. The processor 110 can control contents executed in the display device 100 based on a control command. For instance, the processor 110 can display an image received from the camera unit 130 on the display unit 120. The processor 110 can capture an image received from the camera unit 130 based on a received input (e.g., a touch input, a voice input, an input based on image analysis and the like). The processor 110 can recognize a gesture or a shape by analyzing an image. For instance, the processor 110 can determine identity of an image based on a shape of the image, color of the image, brightness of the image and the like. The processor 110 can determine an image having identity greater than a threshold value as an identical image.

Meanwhile, the display device 100 shown in FIG. 2 corresponds to a block diagram according to one embodiment. Blocks shown in a manner of being separated from each other are depicted to logically distinguish hardware configuration units from each other. Hence, the configuration units of the aforementioned display device 100 can be implemented by a single chip or a plurality of chips according to a design of the display device. And, the configuration units of the aforementioned display device 100 can be connected with each other via a bus.

Meanwhile, the display device 100 according to the present specification can be controlled based on various inputs. For instance, the display device 100 can include a physical button and may receive an input from the physical button. The display device 100 may include a voice reception unit, perform voice recognition based on received voice and can be controlled based on the voice recognition. The display device 100 can be controlled based on a touch input. Moreover, the display device 100 may be controlled based on a combination of the aforementioned inputs. The display device 100 may control an external device based on the aforementioned inputs and a combination thereof.

In the following, operations performed by the display device 100 are explained with reference to FIG. 3 to FIG. 11. Configuration of the aforementioned display device 100 can be used for an operation of the display device described in the following. In the following description, an operation of the display device 100 can be explained in a manner of being identical to an operation of the processor 110.

Figure 3:
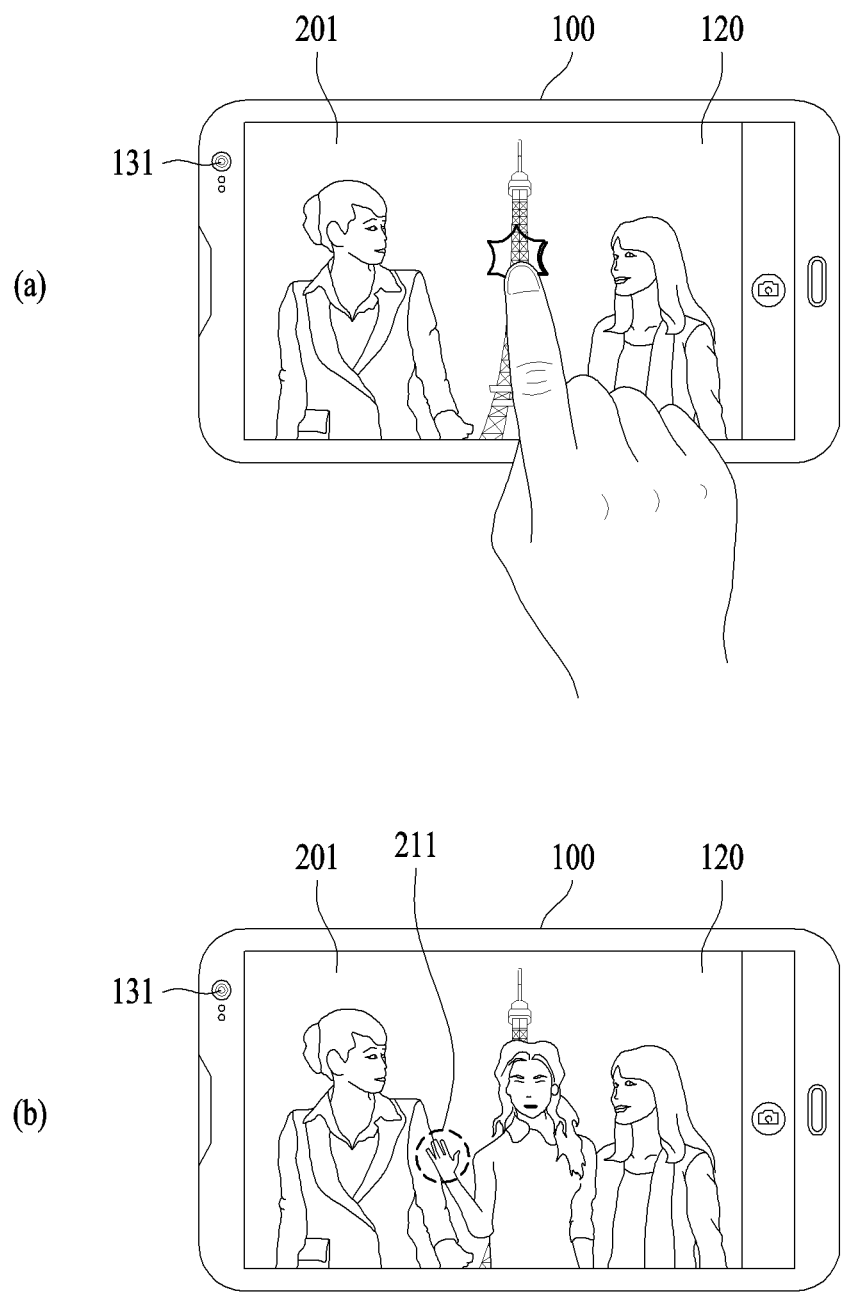
FIG. 3 is a diagram for location designation of a gesture according to one embodiment.

FIG. 3 is a diagram for location designation of a gesture according to one embodiment.

The display device 100 according to the present specification can recognize a gesture based on an area designated by a user. The display device 100 can designate an area on which a gesture is to be recognized based on a long-press touch input, a tapping or a double tapping of a user. The display device 100 can provide a separate software button or an interface to designate an area on which a gesture is to be recognized.

Referring to FIG. 3, a first image 201 received from a rear side camera (not depicted) is displayed on the display unit 120. A user can configure an area on which a gesture is to be recognized by touching the display unit 120. Referring to FIG. 3(a), a user configures a point between two persons as the area on which a gesture is to be recognized.

A user can select one gesture from a plurality of predetermined gestures. A gesture can be configured based on an operation of at least one selected from the group consisting of a hand, an arm and a face of the user. For instance, the gesture may correspond to a smile. In this case, the display device 100 can determine the smile of the user based on change of the corner of mouth or change of the corner of eyes of the user. And, the gesture may correspond to showing a palm, unfolding a part of fingers, building a thumb or waving a hand. In this case, the display device 100 may determine the gesture of the user by tracing a shape of a hand of the user. And, more complex operations can be configured as a gesture. And, as mentioned in the following description, a user may register a specific operation as a gesture.

If a gesture substantially identical to a predetermined gesture is recognized on a configured area in a first image 201, the display device 100 can capture the first image. In FIG. 3(b), the predetermined gesture corresponds to showing a palm. If a user goes to a location configured by the user and poses the predetermined gesture, the display device 100 can capture an image using a rear side camera. And, the display device 100 may capture the first image 201 at the moment of recognizing the gesture or may capture the first image 201 after a predetermined time elapsed from the moment of recognizing the gesture. And, if the gesture is recognized from the first image 201, the display device 100 may capture a plurality of first images 201 according to a predetermined time interval.

As mentioned in the foregoing description, if a gesture or a location on which the gesture is to be recognized is designated, a user can take a picture including composition and a posture that the user wants.

Figure 4:
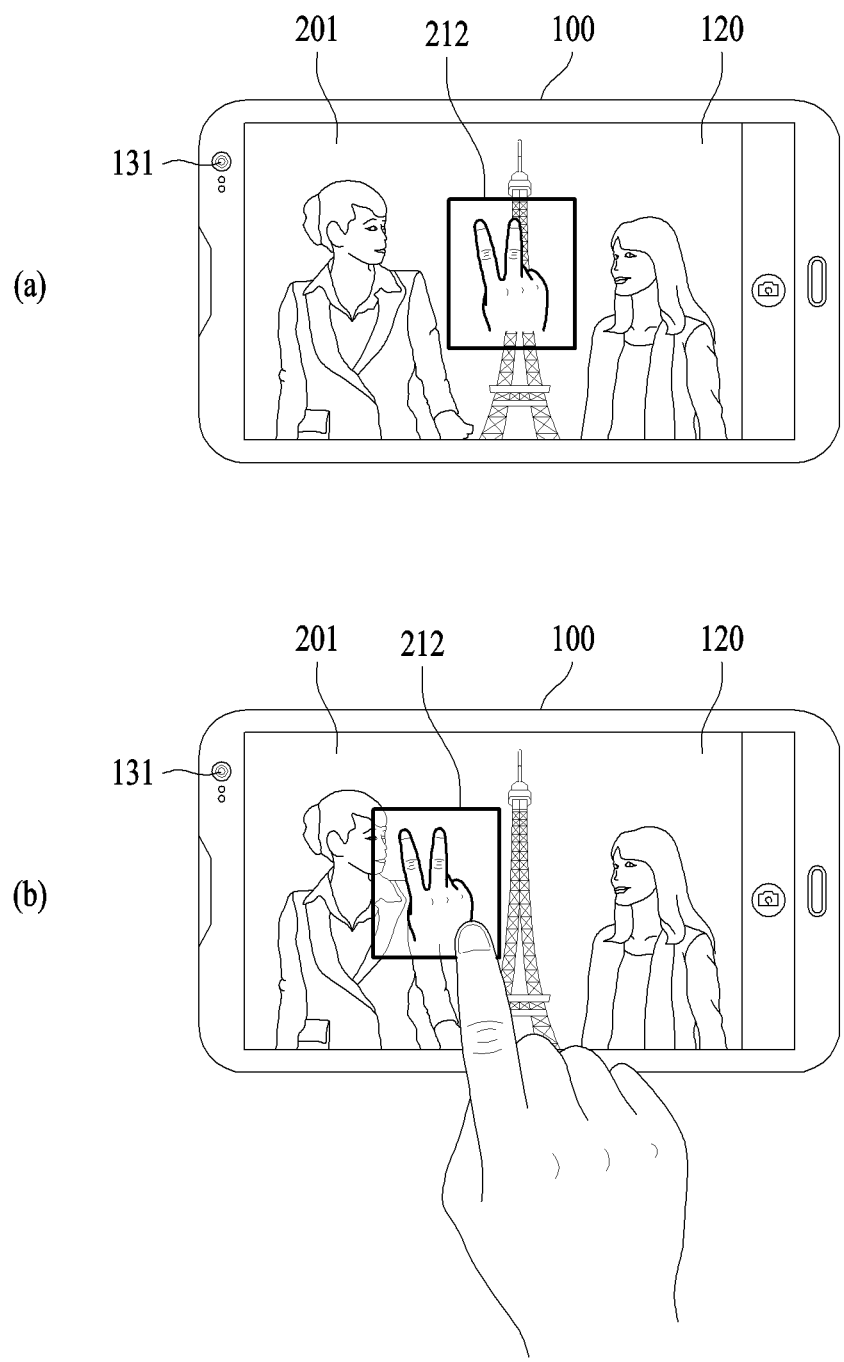
FIG. 4 is a diagram for location designation of a gesture using a thumbnail according to one embodiment.

FIG. 4 is a diagram for location designation of a gesture using a thumbnail according to one embodiment.

As shown in FIG. 4(a), the display device 100 can display a thumbnail 212 including a predetermined gesture on a first image 201. As mentioned earlier with reference to FIG. 3, an input of various types can be used to designate an area on which a gesture is to be recognized. For instance, if a long-press touch input is received on the display unit 120, the display unit 100 may display the thumbnail 212 including the predetermined gesture on a corresponding position of the display unit. And, if a long-press touch input is received on the display unit 120, the display device 100 displays a plurality of predetermined thumbnails and may display a thumbnail 212 including a gesture selected based on a user selection.

As shown in FIG. 4(b), a user can move a thumbnail 212 using a touch input. For instance, the user can move the thumbnail 212 by dragging the thumbnail. If the thumbnail 212 is moved, the display device 100 recognizes a gesture based on a position of the moved thumbnail 212. In particular, if a gesture corresponding to the thumbnail 212 is recognized in a position corresponding to the thumbnail in the first image 201, the display device 100 can capture the first image 201. Referring to FIG. 4, the thumbnail 212 includes a V gesture. Yet, this is just an example only. Various gestures can be used as a predetermined gesture.

Figure 5:
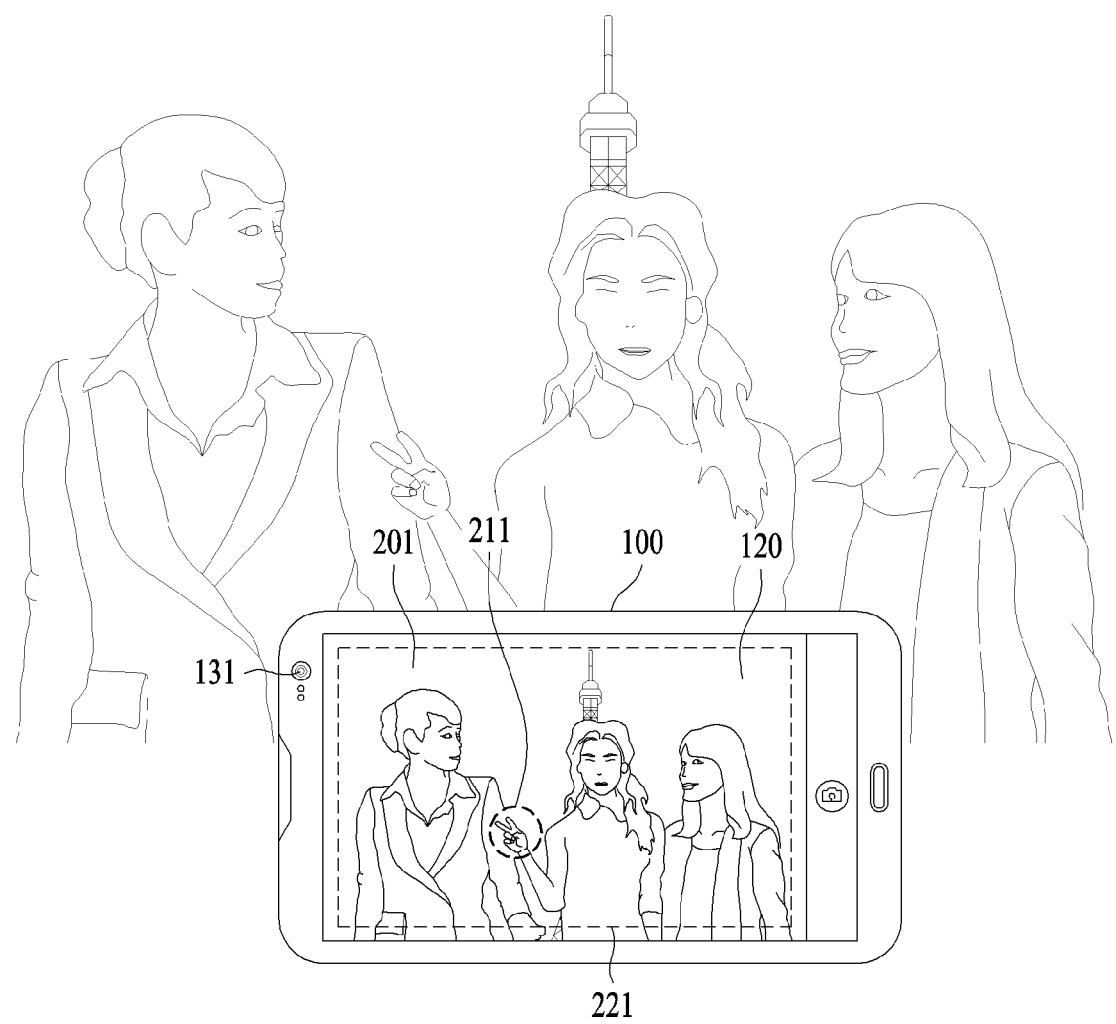
FIG. 5 is a diagram for one embodiment of a display device providing a guide on composition of capturing.

FIG. 5 is a diagram for one embodiment of a display device providing a guide on composition of capturing.

Unlike a case of using a tripod, in case of asking another person to take a picture, it is difficult for a user to obtain desired composition. In order to secure composition of capturing intended by the user, the display device 100 may provide a visual, an auditory and/or a tactile guide to the user.

For instance, once an area on which a gesture 211 is to be recognized is configured, the display device 100 may provide a visual guide 221 to a user to set an angle of view of a rear side camera (not depicted). In an example of FIG. 5, the guide 221 is provided via image recognition on the first image 210. The display device 100 can provide an angle of view intended by the user on the first image 201 as the guide 221.

If a direction at which the rear side camera is facing is getting out of the intended angle of view, the display device 100 can provide a guide message, which indicates to move the display device 100, to a user as an auditory guide. And, if the direction at which the rear side camera is facing is getting out of the intended angle of view, the display device 100 can provide vibration to the user.

FIG. 6 is a diagram for registration of a gesture according to one embodiment.

As mentioned earlier with reference to FIG. 3, a user may register a preferred gesture. The display device 100 can sense a gesture using a front side camera 131.

Referring to FIG. 6(a), a long-press touch input is received by the display device as a gesture configuration input. The long-press touch input is just an example only. Inputs of various types can be defined as the gesture configuration input. For instance, the gesture configuration input can include at least one selected from the group consisting of a short-touch input, a long-ouch input, tapping, multi tapping and a pattern input. The gesture configuration input corresponds to an input making the display device configure a new gesture or a temporary gesture. A position of a gesture recognition area mentioned earlier with reference to FIG. 3 to FIG. 5 can be configured based on a position of the gesture configuration input.

As shown in FIG. 6(b), if the gesture configuration input is received, the display device 100 can display a second image 202 received from a front side camera 131 on at least one part of the first image 201. And, the display device 100 can configure a new gesture or a temporary gesture based on the second image 202. For instance, as shown in FIG. 6(b), when a user holds up the V sign, it can be configured as the temporary gesture.

The display device 100 can configure a second image 202, which is recognized after a predetermined time elapsed from a moment of receiving a gesture input, as a new gesture or a temporary gesture. And, the display device 100 can configure the second image 202 as a new gesture or a temporary gesture based on a touch input inputted on the second image 202.

If a gesture input is received, the display device 100 can configure a gesture based on a plurality of second images 202 received from a front side camera 131. For instance, after a gesture configuration input is received, the display device 100 can configure a series of second images 202 sensed during a predetermined time as a gesture. For instance, a user may configure an operation of waving a hand, an operation of nodding a head and the like as a gesture.

And, a user can configure an area on which a new or a temporary gesture is to be recognized on the first image 201 in a manner of moving the second image 202. For instance, the user may move the second image 202 on the first image 201 by dragging the second image 202. And, the display device 100 can reconfigure an area on which a gesture is to be recognized based on a position of the moved second image 202.

Figure 7:
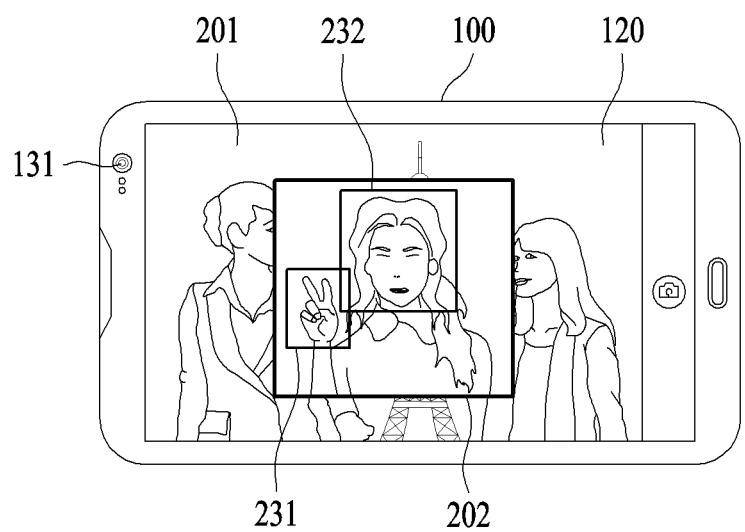
FIG. 7 is a diagram for designation of a gesture recognition area according to one embodiment.

FIG. 7 is a diagram for designation of a gesture recognition area according to one embodiment.

As mentioned earlier with reference to FIG. 3 to FIG. 6, an area on which a gesture is to be recognized can be designated on a first image 201. Moreover, the display device according to the present specification can recognize a gesture using a second image 202. In particular, the display device can designate an area to be recognized as a gesture on the second image 202.

The display device 100 can recognize one or more areas of the second image 202 as a gesture. As mentioned earlier with reference to FIG. 6, if a gesture configuration input is received, the display device displays the second image 202 received from the front side camera 131 on the display unit 120. In this case, the display device 100 can determine an area to be configured (or reconfigured) as a gesture based on a touch input.

For instance, a user may touch a face and a hand in the second image 202. In this case, the display device 100 can configure the hand and the face as a first recognition area 231 and a second recognition area 232, respectively. Hence, the user can designate a part to be recognized as a gesture in the second image 202. Referring to an example of FIG. 7, a V sign pose of the hand and smile of the face can be recognized as gestures, respectively. Hence, if both the V sign pose of the hand and the smile of the face are recognized on predetermined positions of the first image 201, the display device 100 can capture the first image 201.

And, the display device 100 can provide a visual guide on an area configured as a gesture to a user. As shown in FIG. 7, the display device 100 can display areas capable of being recognized as gestures from the second image 202 as a first recognition area 231 and a second recognition area, respectively. For instance, the display device 100 can provide a visual guide on at least one selected from the group consisting of eyes, a face, a nose, a mouth and a hand included in the second image 202. A user may determine which area is to be recognized as a gesture by touching the first recognition area 231 or the second recognition area 232.

Figure 8:
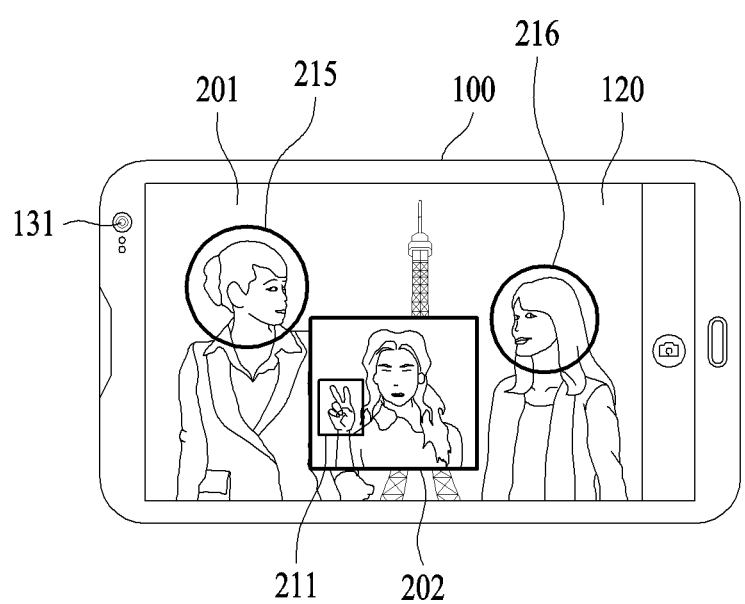
FIG. 8 is a diagram for designation of a gesture recognition area according to a different embodiment.

FIG. 8 is a diagram for designation of a gesture recognition area according to a different embodiment.

As mentioned earlier with reference to FIG. 3 to FIG. 7, the display device 100 can recognize a gesture configured based on a second image 202 in a position configured on a first image 201. Moreover, the display device 100 may recognize additional gestures.

For instance, a user may want to configure not only a gesture of the user but also a location and a gesture of persons who are taking a picture with the user in advance. In this case, the user can configure an additional gesture by touching the first image 201 on the display unit 120.

In FIG. 8, the user touches heads of different persons on the first image 201. The display device 100 configures the touched areas as a first additional gesture 215 and a second additional gesture 216, respectively, in response to the touch input. In this case, if all gestures including the gesture 211 of the user, the first additional gesture 215 and the second additional gesture 216 are recognized on the position configured by the user, the display device 100 can capture the first image 201.

Figure 9:
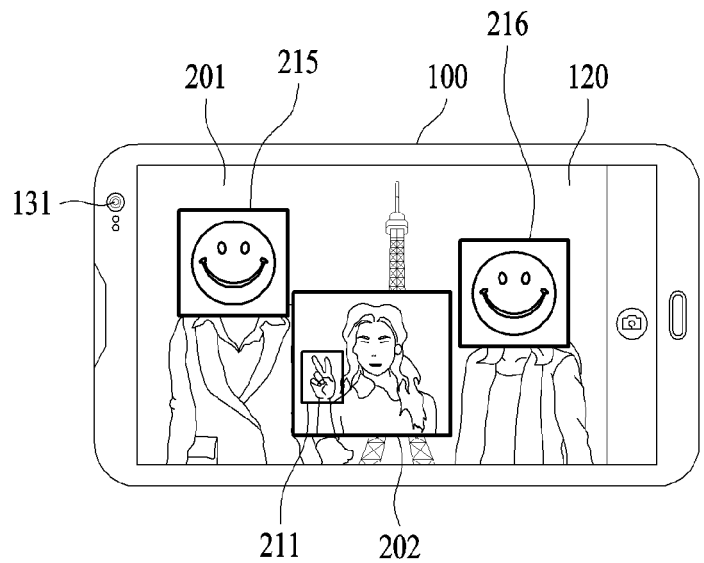
FIG. 9 is a diagram for designation of a gesture recognition area according to a further different embodiment.

FIG. 9 is a diagram for designation of a gesture recognition area according to a further different embodiment.

As mentioned earlier with reference to FIG. 4, a recognition position of a gesture can be designated using a thumbnail including a gesture. In FIG. 8, a part of the first image 201 is designated as an additional gesture. Yet, as shown in FIG. 9, thumbnails corresponding to predetermined gestures can be used as additional gestures 215/216.

As shown in FIG. 9, the display device 100 can display images (smile marks) corresponding to additional gestures 215/216 on the first image 201. In this case, if smile is recognized on positions in which the additional gestures 215/216 are designated and a gesture 211 of a user is recognized, the display device 100 can capture the first image 201.

In particular, the display device 100 according to the present specification can use an image corresponding to a predetermined gesture and an image itself received from a front side or a rear side camera as a gesture. Both the image corresponding to the predetermined gesture and the image received from the front or the rear camera can be used in a manner of being combined with each other.

Operations of the display device 100 mentioned earlier with reference to FIG. 3 to FIG. 9 can be combined with each other. Moreover, the operations of the display device 100 can be executed by the structure of the display device 100 mentioned earlier with reference to FIG. 2.

Figure 10:
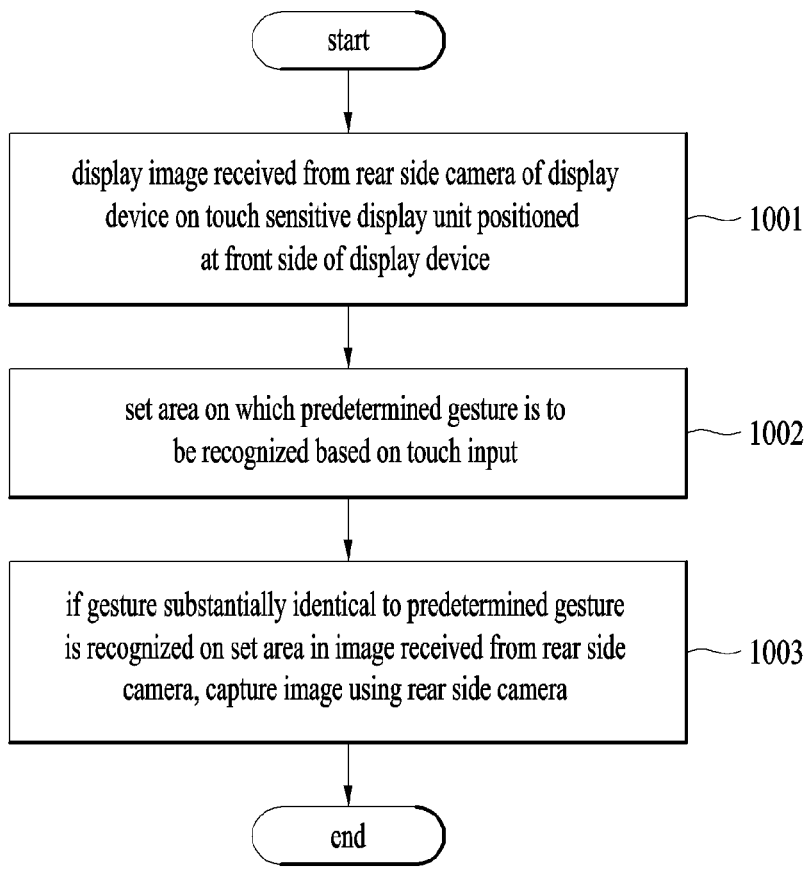
FIG. 10 is a flowchart for a method of controlling a display device according to one embodiment.

FIG. 10 is a flowchart for a method of controlling a display device according to one embodiment.

The display device displays an image received from a rear side camera of the display device on a touch sensitive display unit positioned at the front side of the display device [1001]. For instance, the display device can display the image received from the rear side camera in response to execution of a camera application.

The display device configures an area on which a predetermined gesture is to be recognized based on a touch input [1002]. As mentioned earlier with reference to FIG. 3, for instance, a user may configure the area on which the predetermined gesture is to be recognized using a long-press touch input. And, as mentioned earlier with reference to FIG. 4, a user may designate the area on which the predetermined gesture is to be recognized using a thumbnail. Meanwhile, if the area on which the gesture is to be recognized is designated, as mentioned earlier with reference to FIG. 5, the display device may provide a guide to a user to set an angle of view.

And, if a gesture substantially identical to the predetermined gesture is recognized on the configured area in the image received from the rear side camera, the display device captures the image using the rear side camera [1003]. As mentioned earlier with reference to FIG. 3, the display device can capture a plurality of images and may capture the image after a predetermined time interval.

FIG. 11 is a flowchart for a method of controlling a display device according to a different embodiment.

Although a method of controlling the display device shown in FIG. 11 is similar to the method of FIG. 10, the method of FIG. 11 is different from the method of FIG. 10 in that a temporary or a new gesture is able to be configured (reconfigured) using a front side camera. In the following, explanation on a similar part is omitted.

The display device displays an image received from a second camera positioned at the rear side of the display device on a touch sensitive display unit positioned at the front side of the display device [1101]

If a gesture configuration input is received, the display device can display an image received from a first camera positioned at the front side of the display device on a part of the displayed image received from the second camera [1102]. As mentioned earlier with reference to FIG. 6, an input of various types can be defined as a gesture configuration input.

And, the display device configures a gesture based on the image received from the first camera [1103]. As mentioned earlier with reference to FIG. 7 to FIG. 9, a user can designate a part of the image received from the first camera as a part to be recognized as a gesture. And, a user can designate a part of the image received from the second camera as an additional gesture.

And, the display device configures an area on which the configured gesture is to be recognized based on a touch input [1104]. As mentioned earlier with reference to FIG. 6, a user can move the area on which the gesture is to be recognized by moving the image received from the first camera.

And, if a gesture substantially identical to the configured gesture is recognized on the configured area in the image received from the second camera, the display device can capture the image using the second camera [1105].

The aforementioned methods of controlling the display device shown in FIG. 10 and FIG. 11 can be performed using the display device mentioned earlier with reference to FIG. 2. Moreover, the methods of controlling the display device shown in FIG. 10 and FIG. 11 can be combined with the operations of the display device mentioned earlier with reference to FIG. 3 to FIG. 9.

A display device according to the present specification and a method of controlling therefor may be not limited to a configuration and method of the aforementioned embodiments. Instead, various modifications can be achieved in a manner that all or a part of each of the embodiments is selectively combined with each other.

Meanwhile, a display device according to the present specification and a method of controlling therefor can be implemented with a software readable by a processor in a recording media readable by the processor, which is equipped in the display device. The recording media readable by the processor may include all kinds of recording devices for storing data capable of being read by the processor. The examples of the recording media readable by the processor may include a ROM, a RAM, a CD-ROM, a magnetic tape, a floppy disc, an optical data storing device and the like. The recording media readable by the processor are distributed to the computer systems connected by a network and codes readable by the processor can be stored and executed in a manner of being distributed.

While the present specification has been described and illustrated herein with reference to the preferred embodiments and diagrams thereof, the present specification may be non-limited to the aforementioned embodiments and it will be apparent to those skilled in the art that various modifications and variations can be made therein without departing from the spirit and scope of the present specification. Thus, it is intended that the present specification covers the modifications and variations of this invention that come within the scope of the appended claims and their equivalents.

What is claimed is:

1. A display device, comprising:
a rear side camera configured to sense an image positioned at a rear side of the display device;
a touch sensitive display unit configured to be positioned at a front side of the display device and display at least one or more images; and
a processor configured to control the rear side camera and the touch sensitive display unit, the processor is further configured to;
display an image received from the rear side camera on the touch sensitive display unit,
set an area on which a predetermined gesture is to be recognized based on a touch input,
capture an image using the rear side camera if a gesture substantially identical to the predetermined gesture is recognized on the area in the image received from the rear side camera,
set an additional gesture for at least a part of the image received from the rear side camera based on a touch input inputted on the displayed image received from the rear side camera, and
capture an image using the rear side camera if the gesture substantially identical to the predetermined gesture is recognized on the set area and a gesture substantially identical to the set additional gesture is recognized in the image received from the rear side camera.

2. The display device of claim 1, wherein the processor is further configured to display a thumbnail containing the predetermined gesture on the displayed image which is received from the rear side camera.

3. The display device of claim 2, wherein the processor is further configured to move a position on which the thumbnail is displayed based on a touch input and wherein the set area is determined based on the moved position on which the thumbnail is displayed.

4. The display device of claim 1, wherein if the area on which the predetermined gesture is to be recognized is set, the processor is further configured to provide at least one of a visual guide and an auditory guide to set an angle of view of the rear side camera.

5. The display device of claim 1, further comprising a front side camera configured to sense an image positioned at the front side of the display device,
wherein if a gesture configuration input is received, the processor is further configured to display an image received from the front side camera on at least a part of the displayed image received from the rear side camera.

6. The display device of claim 5, wherein if the gesture configuration input is received, the processor is further configured to set the area on which the predetermined gesture is to be recognized based on the touch input.

7. The display device of claim 5, wherein the processor is further configured to determine an area to be reset as the predetermined gesture based on a touch input inputted on the displayed image received from the front side camera.

8. The display device of claim 7, wherein the processor is further configured to provide a visual guide on the area to be set as the predetermined gesture.

9. The display device of claim 8, wherein the processor is further configured to provide the visual guide on at least one selected from the group consisting of eyes, a face, a nose, a mouth and a hand contained in the image received from the front side camera.

10. The display device of claim 5, wherein if the gesture configuration input is received, the processor is further configured to reset the predetermined gesture based on the image received from the front side camera.

11. The display device of claim 10, wherein the processor is further configured to reset the predetermined gesture based on the image received from the front side camera on a timing basis that a predetermined time is passed from a time point on which the gesture configuration input is received.

12. The display device of claim 5, wherein if the gesture configuration input is received, the processor is further configured to reset the predetermined gesture based on a plurality of images received from the front side camera.

13. The display device of claim 5, wherein the gesture configuration input comprises at least one of a short-touch input, a long-touch input, tapping, multi-tapping and a pattern input.

14. The display device of claim 1, wherein an image corresponding to the set additional gesture is displayed on the displayed image received from the rear side camera.

15. The display device of clam 1, wherein the processor is further configured to capture an image using the rear side camera after a predetermined time is passed from a time point that the gesture substantially identical to the predetermined gesture is recognized on the set area.

16. The display device of clam 1, wherein if the gesture substantially identical to the predetermined gesture is recognized on the set area, the processor is further configured to capture a plurality of images using the rear side camera.

17. A display device, comprising:
   a first camera configured to sense an image positioned at a front side of the display device;
   a second camera configured to sense an image positioned at a rear side of the display device;
   a touch sensitive display unit configured to be positioned at the front side of the display device and display at least one or more images; and
   a processor configured to control the first camera, the second camera and the touch sensitive display unit, the processor is further configured to;
   display an image received from the second camera on the touch sensitive display unit,
   if a gesture configuration input is received, display an image received from the first camera on at least a part of the displayed image received from the second camera,
   set a gesture based on the image received from the first camera,
   set an area on which the set gesture is to be recognized based on a touch input,
   if a gesture substantially identical to the set gesture is recognized on the set area in the image received from the second camera, capture an image using the second camera.

18. A method of controlling a display device, comprising the steps of:
   displaying an image received from a rear side camera of the display device on a touch sensitive display unit positioned at the front side of the display device;
   setting an area on which a predetermined gesture is to be recognized based on a touch input;
   capturing an image using the rear side camera if a gesture substantially identical to the predetermined gesture is recognized on the set area in the image received from the rear side camera;
   setting an additional gesture for at least a part of the image received from the rear side camera based on a touch input inputted on the displayed image received from the rear side camera; and
   capturing an image using the rear side camera if the gesture substantially identical to the predetermined gesture is recognized on the set area and a gesture substantially identical to the set additional gesture is recognized in the image received from the rear side camera.

19. A method of controlling a display device, comprising:
   displaying an image received from a second camera positioned at the rear side of the display device on a touch sensitive display unit positioned at the front side of the display device;
   if a gesture configuration input is received, displaying an image received from a first camera positioned at the front side of the display device on at least a part of the displayed image received from the second camera;
   setting a gesture based on the image received from the first camera;
   setting an area on which the set gesture is to be recognized based on a touch input; and
   if a gesture substantially identical to the set gesture is recognized on the set area in the image received from the second camera, capturing an image using the second camera.

\* \* \* \* \*